(12) United States Patent
Teranishi et al.

(10) Patent No.: US 8,104,906 B2
(45) Date of Patent: Jan. 31, 2012

(54) ELECTRONIC FLASH APPARATUS

(75) Inventors: Masaaki Teranishi, Yokohama (JP);
Eiichi Sugimoto, Hadano (JP); Tatsuya Goto, Sagamihara (JP); Eiji Takashiro, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 298 days.

(21) Appl. No.: 12/324,938

(22) Filed: Nov. 28, 2008

(65) Prior Publication Data

US 2009/0161338 A1 Jun. 25, 2009

(30) Foreign Application Priority Data

Nov. 27, 2007 (JP) ................................. 2007-306091

(51) Int. Cl.
*G03B 15/02* (2006.01)

(52) U.S. Cl. ............................. 362/16; 362/236; 362/346

(58) Field of Classification Search .................. 362/555, 362/345–347, 341, 320, 11, 16, 234–236, 362/17, 13, 8, 3, 12, 247, 249.01, 321, 516–518, 362/350, 249.02–249.04; 396/267, 61, 62, 396/155, 182, 200, 353
See application file for complete search history.

(56) References Cited

U.S. PATENT DOCUMENTS

| | | | | |
|---|---|---|---|---|
| 2,314,829 A * | 3/1943 | Hunter | ............................ | 396/182 |
| 4,654,562 A * | 3/1987 | Berdat | ....................... | 315/200 A |
| 5,349,504 A * | 9/1994 | Simms et al. | ................... | 362/555 |
| 6,072,957 A * | 6/2000 | Shibayama | .................... | 396/158 |
| 6,474,857 B2 * | 11/2002 | Ott et al. | .......................... | 362/551 |
| 6,679,621 B2 * | 1/2004 | West et al. | ....................... | 362/327 |
| 6,955,459 B2 * | 10/2005 | Mochizuki et al. | ............ | 362/602 |
| 7,090,375 B2 * | 8/2006 | Kuisma | ........................... | 362/225 |
| 2004/0140776 A1 * | 7/2004 | Fleischmann et al. | ......... | 315/312 |
| 2005/0237766 A1 * | 10/2005 | Klettke | .......................... | 362/612 |
| 2006/0198140 A1 * | 9/2006 | Cheng | ............................. | 362/247 |
| 2008/0112180 A1 * | 5/2008 | Okada | ............................ | 362/518 |

FOREIGN PATENT DOCUMENTS

JP 2008-17814 A 1/2005

* cited by examiner

*Primary Examiner* — Julie Shallenberger
(74) *Attorney, Agent, or Firm* — Holtz, Holtz, Goodman & Chick, PC

(57) ABSTRACT

An electronic flash apparatus includes a flash device, a light emitting device which is different from the flash device, and a concave reflector configured to reflect light beams from the flash device and the light emitting device. The concave reflector includes a flash-device reflecting surface configured to reflect the light beams from the flash device and a light-emitting-device reflecting surface configured to reflect the light beams from the light emitting device. The flash device is disposed inside the concave reflector, and the light emitting device is disposed outside the concave reflector. The light-emitting-device reflecting surface is disposed at a position where a light path of the light beams from the flash device does not exist. The apparatus further includes a light guiding member configured to guide the light beams from the light emitting device to the light-emitting-device reflecting surface positioned inside the concave reflector.

10 Claims, 4 Drawing Sheets

ELECTRONIC FLASH APPARATUS

This application claims the priority benefit under 35 U.S.C. §119 of Japanese Patent Application No. 2007-306091 filed on Nov. 27, 2007, which is hereby incorporated in its entirety by reference.

BACKGROUND

1. Technical Field

The present invention relates to an electronic flash apparatus including a flash device, a light emitting device which is different from the flash device, and a concave reflector for reflecting light beams from the flash device and the light emitting device. In particular, the present invention relates to an electronic flash apparatus that can provide light distribution controls for the flash device and the light emitting device completely independently.

2. Description of the Related Art

Conventionally, electronic flash apparatuses including a flash device, a light emitting device which is different from the flash device, and a concave reflector for reflecting light beams from the flash device and the light emitting device have been known. Examples of this type of electronic flash apparatuses include one disclosed in FIG. 4 of Japanese Patent Application Laid-Open No. 2005-17814, the entire contents of which are hereby incorporated by reference. Hereinafter, this apparatus will be referred to as a conventional electronic flash apparatus.

In the conventional electronic flash apparatus, a xenon tube is used as a flash device to emit light beams. Part of the light beams is directed to the convex reflector and reflected by the same to be projected in the illumination direction of the electronic flash apparatus. In addition to the flash device, a light emitting diode is used as a light emitting device to emit light beams. The light beams therefrom are also reflected by the same reflecting surface of the reflector as in the case of the flash device, to be projected in the illumination direction of the electronic flash apparatus. Because the same reflecting surface is utilized for both the light beams from the flash device and the light beams from the light emitting diode in the conventional electronic flash apparatus, the light distribution pattern formed by the light beams from the flash device and that formed by the light beams from the light emitting device are partly overlapped with each other.

In other words, the conventional electronic flash apparatus cannot provide control for the light distribution from the flash device and that from the light emitting device completely independently.

SUMMARY

According to an aspect of the present invention, an electronic flash apparatus can include a flash device and a light emitting device which is different from the flash device, and can provide control for the light distribution from the flash device and the light distribution from the light emitting device completely independently.

According to another aspect of the present invention, an electronic flash apparatus can include a flash device, a light emitting device which is different from the flash device, and a concave reflector configured to reflect light beams from the flash device and the light emitting device. The concave reflector includes a flash-device reflecting surface configured to reflect the light beams from the flash device and a light-emitting-device reflecting surface configured to reflect the light beams from the light emitting device. The flash device is inside the concave reflector, and the light emitting device is disposed outside the concave reflector. The light-emitting-device reflecting surface is disposed at a position where a light path of the light beams from the flash device does not exist. The electronic flash apparatus can further include a light guiding member configured to guide the light beams from the light emitting device to the light-emitting-device reflecting surface positioned inside the concave reflector.

In the electronic flash apparatus according to another aspect of the present invention, the light emitting device and the light guiding member can be disposed on a first side of the reflector and the light-emitting-device reflecting surface can be disposed on a second side of the reflector, wherein the first and second sides are opposed to each other.

In the electronic flash apparatus according to still another aspect of the present invention, the reflector can have an intermediate reflecting surface configured to reflect the light beams from the light guiding member to the light-emitting-device reflecting surface. The light emitting device, the light guiding member, and the light-emitting-device reflecting surface can be disposed on a first side of the reflector and the intermediate reflecting surface can be disposed on a second side of the reflector, wherein the first and second sides are opposed to each other.

In the electronic flash apparatus, the light-emitting-device reflecting surface may include a plurality of flat stepped surfaces and the intermediate reflecting surface may include a plurality of flat stepped surfaces.

In the electronic flash apparatus according to still another aspect of the present invention, apparatus may include at least two light emitting devices, at least two light-emitting-device reflecting surfaces and at least two light guiding members, wherein respective quantities of the light emitting devices, the light-emitting-device reflecting surfaces, and the light guiding members are the same. One of the light emitting devices, a corresponding one of the light guiding members, and a corresponding one of the light-emitting-device reflecting surfaces can be combined to form one optical system including a light path.

According to another aspect of the present invention, an electronic flash apparatus can include a flash device, a first light emitting device which is different from the flash device, a second light emitting device which is different from the flash device, and a concave reflector configured to reflect light beams from the flash device, the first light emitting device, and the second light emitting device. The concave reflector has a first side and a second side opposed to each other. The concave reflector can separately include a flash-device reflecting surface configured to reflect the light beams from the flash device, a first light-emitting-device reflecting surface configured to reflect the light beams from the first light emitting device, and a second light-emitting-device reflecting surface configured to reflect the light beams from the second light emitting device. The flash device can be disposed inside the concave reflector. The first light emitting device can be disposed on the first side of and outside the concave reflector, and the second light emitting device can be disposed on the second side of and outside the concave reflector. Furthermore, the first light-emitting-device reflecting surface can be disposed on the first side of the reflector at a position where a light path of the light beams from the flash device does not exist, and the second light-emitting-device reflecting surface can be disposed on the second side of the reflector at a position where the light path of the light beams from the flash device does not exist. The electronic flash apparatus can further include a first light guiding member disposed on the first side of the reflector and configured to guide the light beams from the first light emitting device to the second light-emitting-device reflecting surface positioned inside the concave reflector, and a second light guiding member disposed on the second side of the reflector and configured to guide the light beams from the second light emitting device to the first light-emitting-device reflecting surface positioned inside the concave reflector. In this electronic flash apparatus, the light beams from the first light emitting device can be guided by the first light guiding member to the second light-emitting-device reflecting surface and reflected by the second light-emitting-device reflecting surface toward the first light-emitting-device reflecting surface to be reflected by the first light-emitting-device reflecting surface in the illumination direction of the electronic flash apparatus. Furthermore, the light beams from the second light emitting device can be guided by the second light guiding member to the first light-emitting-device reflecting surface and reflected by the first light-emitting-device reflecting surface toward the second light-emitting-device reflecting surface to be reflected by the second light-emitting-device reflecting surface in the illumination direction of the electronic flash apparatus.

According to still another aspect of the present invention, an electronic flash apparatus can include a flash device, a light emitting device which is different from the flash device, and a concave reflector configured to reflect light beams from the flash device and the light emitting device. The concave reflector has a first side and a second side opposed to each other. The concave reflector can separately include a flash-device reflecting surface configured to reflect the light beams from the flash device and a light-emitting-device reflecting surface configured to reflect the light beams from the light emitting device. The flash device can be disposed inside the concave reflector, and the light emitting device can be disposed outside and behind the concave reflector. The light-emitting-device reflecting surface can be divided into a first light-emitting-device reflecting portion disposed on the first side of the reflector at a position where a light path of the light beams from the flash device does not exist and a second light-emitting-device reflecting portion disposed on the second side of the reflector at a position where a light path of the light beams from the flash device does not exist. The electronic flash apparatus can further include a light guiding member configured to guide the light beams from the light emitting device to the light-emitting-device reflecting surface inside the concave reflector. The light guiding member can include a first light guiding portion extending on the first side of the reflector and a second light guiding portion extending on the second side of the reflector. In this electronic flash apparatus, part of the light beams from the light emitting device enters the light guide member and is guided by the first light guiding portion to the second light-emitting-device reflecting portion and reflected by the second light-emitting-device reflecting portion toward the first light-emitting-device reflecting portion to be reflected by the first light-emitting-device reflecting portion in the illumination direction of the electronic flash apparatus. Furthermore, part of the light beams from the light emitting device enters the light guide member and is guided by the second light guiding portion to the first light-emitting-device reflecting portion and reflected by the first light-emitting-device reflecting portion toward the second light-emitting-device reflecting portion to be reflected by the second light-emitting-device reflecting portion in the illumination direction of the electronic flash apparatus.

In the electronic flash apparatus, the light guiding member can be flexible, and can be made of, for example, optical fibers.

In the electronic flash apparatus according to one aspect of the present invention, the flash-device reflecting surface configured to reflect the light beams from the flash device and the light-emitting-device reflecting surface configured to reflect the light beams from the light emitting device different from the flash device can be separately provided to the concave reflector. The flash device is disposed inside the concave reflector and the light-emitting-device reflecting surface is disposed at a position where a light path of the light beams from the flash device does not exist. Furthermore, the light emitting device is disposed outside the concave reflector. The light guiding member is provided so as to guide the light beams from the light emitting device to the light-emitting-device reflecting surface inside the concave reflector.

According to this configuration, the light beams from the light emitting device are not incident on the flash-device reflecting surface. As a result, only the light beams from the flash device can be incident on the flash-device reflecting surface to be reflected by the flash-device reflecting surface in the illumination direction of the electronic flash apparatus. In addition, the light beams from the flash device are not incident on the light-emitting-device reflecting surface. As a result, only the light beams from the light emitting device can be incident on the light-emitting-device reflecting surface to be reflected by the light-emitting-device reflecting surface in the illumination direction of the electronic flash apparatus. In this way, the light distribution of the light beams from the flash device and the light emitting device can be controlled completely independently.

In the electronic flash apparatus, the light emitting device and the light guiding member can be disposed on the first side of the reflector (for example, on the lower side of the flash-device reflecting surface of the concave reflector) and the light-emitting-device reflecting surface can be disposed on the second side of the reflector (for example, on the upper side of the flash-device reflecting surface of the concave reflector).

In this configuration, the light beams emitted from the light emitting device disposed, for example, on the lower side of the flash-device reflecting surface can be guided by the light guiding member disposed, for example, on the lower side of the flash-device reflecting surface to be directed toward the light-emitting-device reflecting surface disposed, for example, on the upper side of the flash-device reflecting surface. The light beams can be reflected by the light-emitting-device reflecting surface to be projected in the illumination direction of the electronic flash apparatus. With this structure in which, for example, the components are arranged in the vertical direction (namely, disposed on the upper side and the lower side), the entire horizontal size of the electronic flash apparatus according to the present invention can be maintained similar to the conventional apparatus while the apparatus can provide control for the light distribution from the flash device and the light distribution from the light emitting device completely independently.

In another configuration of the electronic flash apparatus, the light emitting device, the light guiding member, and the light-emitting-device reflecting surface can be disposed on the first side of the reflector (for example, on the upper side of the flash-device reflecting surface of the concave reflector). Furthermore, the intermediate reflecting surface configured to reflect the light beams from the light guiding member toward the light-emitting-device reflecting surface can be disposed on the second side of the reflector (for example, on the lower side of the flash-device reflecting surface of the concave reflector).

In this configuration, the light beams emitted from the light emitting device disposed, for example, on the upper side of the flash-device reflecting surface can be guided by the light guiding member disposed, for example, on the upper side of the flash-device reflecting surface to be directed toward the intermediate reflecting surface disposed, for example, on the lower side of the flash-device reflecting surface. The light beams can be reflected by the intermediate reflecting surface to be directed to the light-emitting-device reflecting surface disposed, for example, on the upper side of the flash-device reflecting surface. The light beams can be reflected by the light-emitting-device reflecting surface to be projected in the illumination direction of the electronic flash apparatus. With this structure in which, for example, the components are arranged in the vertical direction (namely, disposed on the upper side and the lower side), when compared to the case in which the intermediate reflecting surface is not provided, the projected part of the light-emitting-device reflecting surface projected from the upper edge of the flash-device reflecting surface can be shortened, and the reflected light beams from the light-emitting-device reflecting surface can be projected by a wider elevation angle range in the vertical direction.

In another configuration of the electronic flash apparatus, the light-emitting-device reflecting surface may include a plurality of flat stepped surfaces. Furthermore, the intermediate reflecting surface may include a plurality of flat stepped surfaces. When the components are arranged in the vertical direction (namely, disposed on the upper side and the lower side), for example, when compared with the case in which both the light-emitting-device reflecting surface and the intermediate reflecting surface are curved surfaces, the entire vertical dimension of the reflector can be miniaturized.

In another configuration of the electronic flash apparatus, a plurality of sets of the light emitting device, the light guiding member, and the light-emitting-device reflecting surface are provided (in the shown example, there are two sets). Namely, the concave reflector can separately include the flash-device reflecting surface configured to reflect the light beams from the flash device, the first light-emitting-device reflecting surface configured to reflect the light beams from the first light emitting device which is different from the flash device, and the second light-emitting-device reflecting surface configured to reflect the light beams from the second light emitting device which is different from the flash device. In this apparatus, the flash device can be disposed inside the concave reflector, and the first light-emitting-device reflecting surface and the second light-emitting-device reflecting surface can be disposed in the reflector at respective positions where the light path of the light beams from the flash device does not exist. Furthermore, the first light emitting device and the second light emitting device can be disposed outside the concave reflector. The electronic flash apparatus can further include the first light guiding member configured to guide light beams from the first light emitting device to the second light-emitting-device reflecting surface positioned inside the concave reflector, and the second light guiding member configured to guide light beams from the second light emitting device to the first light-emitting-device reflecting surface positioned inside the concave reflector. In this electronic flash apparatus, the light beams from the first light emitting device and the second light emitting device cannot be incident on the flash-device reflecting surface. Only the light beams from the flash device can be incident on the flash-device reflecting surface to be reflected in the illumination direction of the electronic flash apparatus. Furthermore, the light beams from the flash device cannot be incident on the first and second light-emitting-device reflecting surfaces. Instead, the light beams from the first light emitting device and the second light emitting device can be incident on the first light-emitting-device reflecting surface and the second light-emitting-device reflecting surface, respectively, to be projected in the illumination direction of the electronic flash apparatus. As a result, the electronic flash apparatus can control the light distribution properties of the light beams from the flash device, the first light emitting device, and the second light emitting device completely independently.

Specifically, in the electronic flash apparatus, the first light emitting device, the first light guiding member, and the first light-emitting-device reflecting surface can be disposed on the first side of the reflector (for example, on the upper side of the flash-device reflecting surface of the concave reflector). Furthermore, the second light emitting device, the second light guiding member, and the second light-emitting-device reflecting surface can be disposed on the second side of the reflector (for example, on the lower side of the flash-device reflecting surface of the concave reflector).

In this configuration, the light beams emitted from the first light emitting device disposed, for example, on the upper side of the flash-device reflecting surface can be guided by the first light guiding member disposed, for example, on the upper side of the flash-device reflecting surface to be directed toward the second light-emitting-device reflecting surface disposed, for example, on the lower side of the flash-device reflecting surface. The light beams can be reflected by the second light-emitting-device reflecting surface to be directed to the first light-emitting-device reflecting surface disposed, for example, on the upper side of the flash-device reflecting surface. The light beams can be reflected by the first light-emitting-device reflecting surface to be projected in the illumination direction of the electronic flash apparatus.

Furthermore, the light beams emitted from the second light emitting device disposed, for example, on the lower side of the flash-device reflecting surface can be guided by the second light guiding member disposed, for example, on the lower side of the flash-device reflecting surface to be directed toward the first light-emitting-device reflecting surface disposed, for example, on the upper side of the flash-device reflecting surface. The light beams can be reflected by the first light-emitting-device reflecting surface to be directed to the second light-emitting-device reflecting surface disposed, for example, on the lower side of the flash-device reflecting surface. The light beams can be reflected by the second light-emitting-device reflecting surface to be projected in the illumination direction of the electronic flash apparatus.

Accordingly, the electronic flash apparatus as configured above can control the light distribution properties of the light beams from the flash device, the first light emitting device, and the second light emitting device completely independently. In other words, three completely independent light distribution control systems can be achieved.

In still another configuration of the electronic flash apparatus, the concave reflector can include a flash-device reflecting surface configured to reflect the light beams from the flash device, and a light-emitting-device reflecting surface configured to reflect the light beams from the light emitting device which is different from the flash device. In this apparatus, the flash device can be disposed inside the concave reflector, and the light emitting device can be disposed outside the concave reflector. The light-emitting-device reflecting surface can be disposed in the reflector at a position where the light path of light from the flash device does not exist. The electronic flash apparatus can further include the light guiding member configured to guide light beams from the light emitting device to the light-emitting-device reflecting surface positioned inside the concave reflector. In this electronic flash apparatus, the light beams from the light emitting device cannot be incident on the flash-device reflecting surface. Only the light beams from the flash device can be incident on the flash-device reflecting surface to be reflected in the illumination direction of the electronic flash apparatus. Furthermore, the light beams from the flash device cannot be incident on the light-emitting-device reflecting surface. Instead, only the light beams from the light emitting device can be incident on the light-emitting-device reflecting surface to be projected in the illumination direction of the electronic flash apparatus. As a result, the electronic flash apparatus can control the light distribution properties of the light beams from the flash device and the light emitting device completely independently.

Specifically, in the electronic flash apparatus, the light emitting device can be disposed behind the reflector (for example, behind the flash-device reflecting surface of the concave reflector). Furthermore, the light-emitting-device reflecting surface can be formed so as to be divided into a first light-emitting-device reflecting portion disposed on a first side of the reflector (for example, on the upper side of the flash-device reflecting surface of the concave reflector) and a second light-emitting-device reflecting portion disposed on a second side of the reflector (for example, on the lower side of the flash-device reflecting surface of the concave reflector). In addition, the light guiding member can include a first light guiding portion extending on the first side of the reflector (for example, on the upper side of the flash-device reflecting surface of the concave reflector) and a second light guiding portion extending on the second side of the reflector (for example, on the lower side of the flash-device reflecting surface of the concave reflector).

In this configuration, part of the light beams emitted from the light emitting device disposed behind the flash-device reflecting surface can enter the light guiding member and be guided by the first light guiding member extending on the upper side of the flash-device reflecting surface to be directed toward the second light-emitting-device reflecting surface disposed, for example, on the lower side of the flash-device reflecting portion. The light beams can be reflected by the second light-emitting-device reflecting portion to be directed to the first light-emitting-device reflecting portion disposed, for example, on the upper side of the flash-device reflecting surface. The light beams can be reflected by the first light-emitting-device reflecting portion to be projected in the illumination direction of the electronic flash apparatus.

Furthermore, another part of the light beams emitted from the light emitting device disposed behind the flash-device reflecting surface can enter the light guiding member and be guided by the second light guiding member extending on the lower side of the flash-device reflecting surface to be directed toward the first light-emitting-device reflecting surface disposed, for example, on the upper side of the flash-device reflecting portion. The light beams can be reflected by the first light-emitting-device reflecting portion to be directed to the second light-emitting-device reflecting portion disposed, for example, on the lower side of the flash-device reflecting surface. The light beams can be reflected by the second light-emitting-device reflecting portion to be projected in the illumination direction of the electronic flash apparatus.

In this configuration, the light beams from a single light emitting device can be efficiently utilized. That is, the electronic flash apparatus with this configuration does not need an increased number of light emitting devices, and can still increase the area from which light beams can be projected in the illumination direction of the apparatus.

In the electronic flash apparatus, the light guiding member can be flexible, and can be made of, for example, optical fibers. In this case, when compared with the case in which the light guiding member is formed of a rigid material, the design flexibility of disposing the light emitting device can be improved.

BRIEF DESCRIPTION OF THE DRAWINGS

These and other characteristics, features, and advantages of the present invention will become clear from the following description with reference to the accompanying drawings, wherein.

DETAILED DESCRIPTION OF EXEMPLARY EMBODIMENTS

Figure 1:
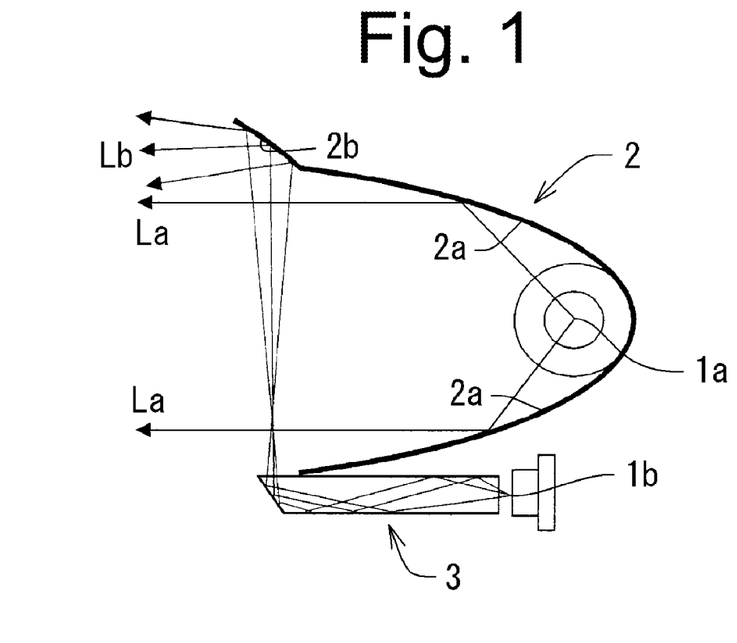
FIG. 1 is a cross-sectional view of an electronic flash apparatus according to one exemplary embodiment made in accordance with the principles of the present invention, when viewed from the right.

A description will now be made below to electronic flash apparatuses of the present invention with reference to the accompanying drawings in accordance with more concrete exemplary embodiments. FIG. 1 is a cross-sectional view illustrating the electronic flash apparatus according to the first exemplary embodiment of the present invention, when viewed from the right side. The electronic flash apparatus according to the first exemplary embodiment may include a flash device 1*a*, a light emitting device 1*b*, a concave reflector 2, and a light guide 3 serving as a light guiding member.

In this electronic flash apparatus, the flash device 1*a* such as a xenon tube can emit light beams. Part of the light beams La can be reflected by the concave reflector 2 to be projected in the illumination direction of the electronic flash apparatus (toward the left side of FIG. 1).

The light emitting device 1*b* such as an LED can emit light beams which are different from those from the flash device. The emitted light beams Lb can enter the light guide 3 such as a light guiding lens to be guided toward the concave reflector 2. The guided light beams can be incident on part of the concave reflector 2 (or a light-emitting-device reflecting surface) to be reflected by the same, thereby being projected in the illumination direction of the apparatus.

Specifically, the concave reflector 2 of the present exemplary embodiment can include a flash-device reflecting surface 2*a* configured to reflect the light beams La from the flash device 1*a* and the light-emitting-device reflecting surface 2*b* configured to reflect the light beams Lb from the light emitting device 1*b*. The flash device 1*a* can be disposed inside the concave reflector 2. The light-emitting-device reflecting surface 2*b* can be disposed at a position where a light path of the light beams La from the flash device 1*a* does not exist. Furthermore, the light emitting device 1*b* can be disposed outside the concave reflector 2, and the light guide 3, or the light guiding lens 3, configured to guide the light beams from the light emitting device 1b to the light-emitting-device reflecting surface 2b disposed inside the concave reflector 2 can be disposed at a position where the light path of the light beams La from the flash device 1a does not exist.

Accordingly, in the present exemplary embodiment, the light beams Lb from the light emitting device 1b cannot reach the flash-device reflecting surface 2a. Only the light beams La from the flash device 1a can reach the flash-device reflecting surface 2a to be reflected by the same, thereby being projected in the illumination direction of the apparatus. On the other hand, the light beams La from the flash device 1a cannot reach the light-emitting-device reflecting surface 2b. Only the light beams Lb from the light emitting device 1b can reach the light-emitting-device reflecting surface 2b to be reflected by the same, thereby being projected in the illumination direction of the apparatus. As a result, the light distribution control of the light beams La from the flash device 1a and the light distribution control of the light beams Lb from the light emitting device 1b can be achieved completely independently.

It should be noted that in the present exemplary embodiment the flash-device reflecting surface 2a can be formed by sweeping the cross-sectional shape of FIG. 1 in the right-to-left direction of the apparatus. In this case, the reflecting surface 2a can be formed of a parabolic columnar surface. It should also be noted that in the present exemplary embodiment the light emitting device 1b and the light guide (light guiding lens) 3 are disposed on the lower side of the flash-device reflecting surface 2a, and the light-emitting-device reflecting surface 2b is disposed on the upper side of the flash-device reflecting surface 2a. However, in the present invention, a reversed arrangement is acceptable.

A description will now be given of the light path of light beams Lb from the light emitting device 1b in the present exemplary embodiment. The light emitting device 1b disposed on the lower side of the flash-device reflecting surface 2a can emit the light beams Lb which enter the light guide (light guiding lens) 3 disposed on the lower side of the flash-device reflecting surface 2a. Then, the light guide 3 can guide the entering light beams Lb to the light-emitting-device reflecting surface 2b disposed on the upper side of the flash-device reflecting surface 2a. Subsequently, the light beams Lb can be reflected by the light-emitting-device reflecting surface 2b to be projected in the illumination direction of the electronic flash apparatus (to the left side of FIG. 1). In the present exemplary embodiment, the apparatus can provide control for the light distribution of light beams La from the flash device 1a and that of light beams Lb from the light emitting device 1b completely independently, without requiring an increase in the right-to-left dimension of the electronic flash apparatus.

In the present exemplary embodiment, the light intensity and the tone of light can be differentiated between the light beams La from the flash device 1a and the light beams Lb from the light emitting device 1b which are projected in the illumination direction of the apparatus (to the left side of FIG. 1). Accordingly, as shown in FIG. 1, the light beams Lb from the light emitting device 1b can be controlled in light intensity and light distribution in an appropriate manner during the process of being guided by the light guide (light guiding lens) 3 and reflected by the light-emitting-device reflecting surface 2b independently of the light beams La from the flash device 1a. As a result, the light beams Lb that have been properly controlled in light intensity and light distribution can be projected in the illumination direction of the electronic flash apparatus (to the left side of FIG. 1).

In the present exemplary embodiment, the light guide (light guiding lens) 3 can have an upper surface (light exiting surface or light projecting surface) that is planar. However, the present invention is not limited to this. Alternatively, the upper surface of the light guide (light guiding lens) 3 can be convex or concave in accordance with the required specification.

In the present exemplary embodiment, the light-emitting-device reflecting surface 2b may be a concavely curved surface. The light beams Lb from the upper surface (or the light projecting surface) of the light guide (light guiding lens) 3 can be incident on the light-emitting-device reflecting surface 2b by an incident angle of approximately 45 degrees. However, the present invention is not limited to this. Alternatively, the light-emitting-device reflecting surface 2b may be a planar surface, a parabolic surface or the like which is a different shape from that shown in FIG. 1. Furthermore, The light beams Lb from the upper surface (or the light projecting surface) of the light guide (light guiding lens) 3 can enter the light-emitting-device reflecting surface 2b by angles other than 45 degrees in an appropriate manner in accordance with intended applications.

In the present exemplary embodiment, the light beams Lb reflected from the light-emitting-device reflecting surface 2b in the illumination direction of the apparatus (to the left side of FIG. 1) can be utilized as red-eye reduction light, distance measuring light, continuous emission light, or the like for photographic cameras, for example. However, the present invention is not limited to these examples. In a modified example, the electronic flash apparatus can perform a first mode in which only the flash device 1a is allowed to emit light beams and the light emitting device 1b is not allowed to emit light beams, a second mode in which the flash device 1a is not allowed to emit light beams and only the light emitting device 1b is allowed to emit light beams, and a third mode in which both the flash device 1a and the light emitting device 1b are allowed to emit light beams. This configuration can achieve the projection of light beams with a different tone and light intensity from those of the light beams La from the flash device 1a and those of the light beams Lb from the light emitting device 1b in the illumination direction. In the modified example of the electronic flash apparatus, by utilizing the first mode and the third mode case by case, desired light intensity and light distribution control can be provided in accordance with the photographing conditions such as long-distance or short-distance photography requiring different light intensity and light distribution.

Hereinafter, a description will be given of another exemplary embodiment of the electronic flash apparatus of the present invention. The electronic flash apparatus of the present exemplary embodiment has almost the same structure as in the first exemplary embodiment except for the features described later. Accordingly, the electronic flash apparatus of the present exemplary embodiment can provide almost the same advantageous effects as in the first exemplary embodiment in addition to the additional advantageous effects described later.

Figure 2:
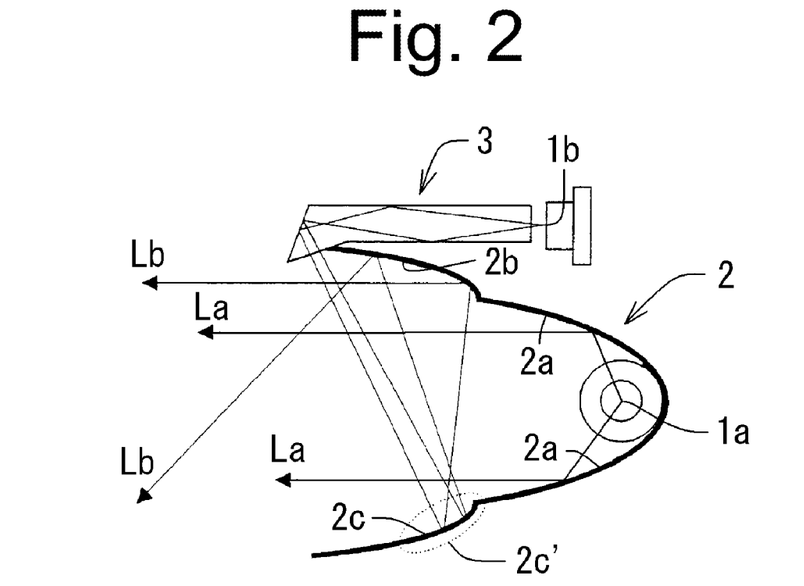
FIG. 2 is a cross-sectional view of an electronic flash apparatus according to another exemplary embodiment.

FIG. 2 is a cross-sectional view illustrating the electronic flash apparatus according to a second exemplary embodiment of the present invention, when viewed from the right side. In the electronic flash apparatus according to the first exemplary embodiment, as shown in FIG. 1, the light beams derived from the light guide (light guiding lens) 3 are allowed to be directly incident on the light-emitting-device reflecting surface 2b. In the electronic flash apparatus according to the second exemplary embodiment, as shown in FIG. 2, the light beams derived from the light guide (light guiding lens) 3 are allowed to be incident on an intermediate reflecting surface 2c first, and then to be reflected and directed by the intermediate reflecting surface 2c to the light-emitting-device reflecting surface 2b.

Specifically, in the present exemplary embodiment, the light emitting device 1b, the light guide (light guiding lens) 3, and the light-emitting-device reflecting surface 2b can be disposed on the upper side of the flash-device reflecting surface 2a. Furthermore, the intermediate reflecting surface 2c can be disposed on the lower side of the flash-device reflecting surface 2a. The intermediate reflecting surface 2c can receive light beams from the light guide (light guiding lens) 3 to reflect them to the light-emitting-device reflecting surface 2b. Accordingly, in the present exemplary embodiment, the light beams emitted from the light emitting device 1b disposed on the upper side of the flash-device reflecting surface 2a can be guided by the light guide (light guiding lens) 3 also disposed on the upper side of the flash-device reflecting surface 2a to the intermediate reflecting surface 2c disposed on the lower side of the flash-device reflecting surface 2a. Then, the light beams can be reflected by the intermediate reflecting surface 2c to be directed to the light-emitting-device reflecting surface 2b disposed on the upper side of the flash-device reflecting surface 2a. The light beams Lb reflected by the light-emitting-device reflecting surface 2b can be projected in the illumination direction of the electronic flash apparatus (to the left side of FIG. 2).

In this case, when compared to the case wherein the intermediate reflecting surface 2c is not provided like the configuration of FIG. 1, the projected part of the light-emitting-device reflecting surface 2b extending and projected from the upper edge of the flash-device reflecting surface 2a can be shortened, and the light beams Lb reflected from the light-emitting-device reflecting surface 2b can be projected by a wider elevation angle range in the vertical direction.

In other words, according to the present exemplary embodiment, despite providing the three reflecting surfaces, including the flash-device reflecting surface 2a, the light-emitting-device reflecting surface 2b, and the intermediate reflecting surface 2c, to the reflector 2, the entire shape of the reflector as shown in FIG. 2 can be designed to have an outer appearance similar to that of the flash-device reflecting surface 2a of the first exemplary embodiment as shown in FIG. 1.

In the present exemplary embodiment, as shown in FIG. 2, the light beams from the light guide (light guiding lens) 3 can be incident on and reflected by the rear portion 2c' of the intermediate reflecting surface 2c. In this case, part of the reflected light beams can be directed toward the upper, rear side of the apparatus (to the right side of FIG. 2), and then be reflected. Furthermore, another part of the reflected light beams can be directed toward the upper, front side of the apparatus (to the left side of FIG. 2), and then be reflected. Furthermore, in the present exemplary embodiment, the angle formed between the light-emitting-device reflecting surface 2b and a horizontal plane (not shown) can be made smaller than that of the reflecting surface 2b of the first exemplary embodiment as shown in FIG. 1. Accordingly, the light beams Lb reflected by the light-emitting-device reflecting surface 2b can be projected in a wider vertical elevation angle range.

In the present exemplary embodiment, the light-emitting-device reflecting surface 2b and the intermediate reflecting surface 2c may be a parabolic surface. However, the present invention is not limited to this. In a modified example, the light-emitting-device reflecting surface 2b and the intermediate reflecting surface 2c may be a pseudo parabolic surface or the like other than a parabolic surface.

Figure 3:
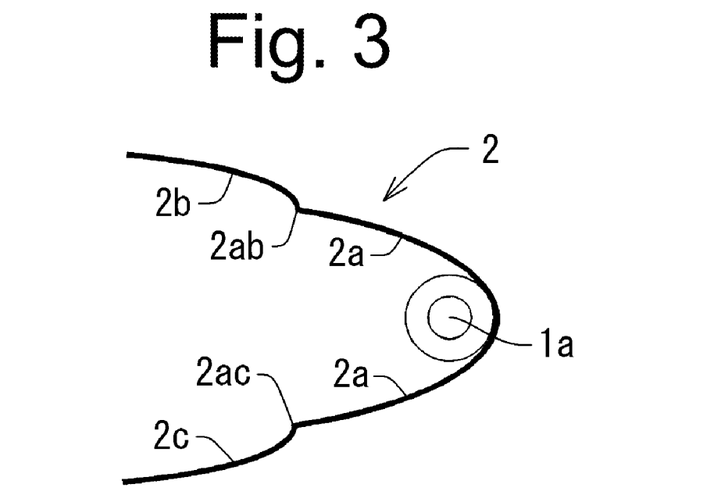
FIG. 3 is a view illustrating the relationships of the border position 2*ab* between the flash-device reflecting surface 2*a* and the light-emitting-device reflecting surface 2*b* and the border position 2*ac* between the flash-device reflecting surface 2*a* and the intermediate reflecting surface 2*c*.

FIG. 3 is a view illustrating the relationships of a border position 2ab between the flash-device reflecting surface 2a and the light-emitting-device reflecting surface 2b and a border position 2ac between the flash-device reflecting surface 2a and the intermediate reflecting surface 2c. In the present invention, the light distribution can be easily controlled by changing these border positions.

For example, the border position 2ab and the border position 2ac can be shifted rearward (to the right side of FIG. 3) in the electronic flash apparatus. By this configuration, the ratio of the light amount from the light-emitting-device reflecting surface 2b with respect to the light amount from the flash-device reflecting surface 2a can be increased.

Conversely, the border position 2ab and the border position 2ac can be shifted frontward (to the left side of FIG. 3) in the electronic flash apparatus. By this configuration, the ratio of the light amount from the light-emitting-device reflecting surface 2b with respect to the light amount from the flash-device reflecting surface 2a can be decreased.

A description will now be given of another exemplary embodiment of the electronic flash apparatus of the present invention with reference to FIG. 4. The electronic flash apparatus of the present exemplary embodiment has almost the same structure as in the second exemplary embodiment except for the features described later. Accordingly, the electronic flash apparatus of the present exemplary embodiment can provide almost the same advantageous effects as in the second exemplary embodiment in addition to the additional advantageous effects described later.

Figure 4:
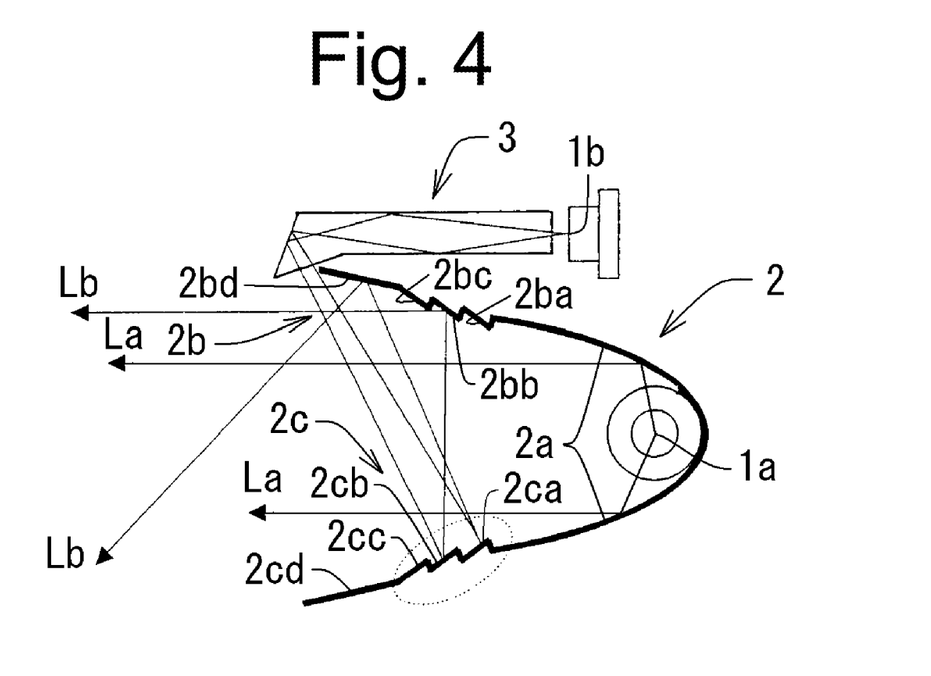
FIG. 4 is a cross-sectional view of an electronic flash apparatus according to still another exemplary embodiment.

FIG. 4 is a cross-sectional view illustrating the electronic flash apparatus according to a third exemplary embodiment of the present invention, when viewed from the right side. In the electronic flash apparatus according to the second exemplary embodiment, as shown in FIG. 2, the light-emitting-device reflecting surface 2b and the intermediate reflecting surface 2c are respective continuous parabolic surfaces. The electronic flash apparatus according to the third exemplary embodiment can include a light-emitting-device reflecting surface 2b including, for example, four flat surfaces 2ba, 2bb, 2bc, and 2bd having a substantially stepped shape, and an intermediate reflecting surface 2c including, for example, four flat surfaces 2ca, 2cb, 2cc, and 2cd having a substantially stepped shape. In this case, compared with the case where the light-emitting-device reflecting surface 2b and the intermediate reflecting surface 2c are both curved surfaces, the entire vertical dimension of the reflector 2 can be miniaturized.

Figure 5:
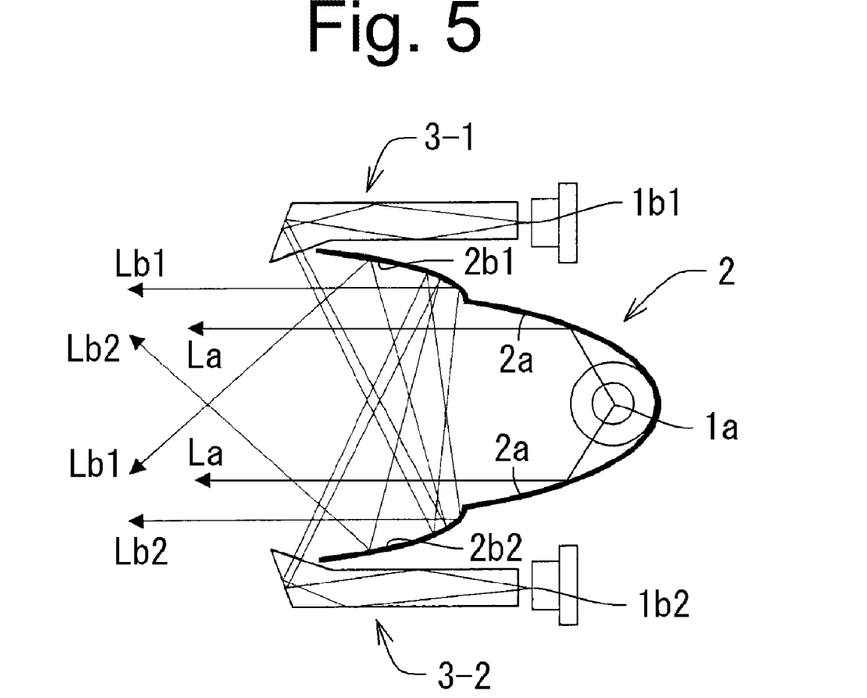
FIG. 5 is a cross-sectional view of an electronic flash apparatus according to still another exemplary embodiment.

A description will now be given of another exemplary embodiment of the electronic flash apparatus of the present invention with reference to FIG. 5. FIG. 5 is a cross-sectional view illustrating the electronic flash apparatus according to a fourth exemplary embodiment of the present invention, when viewed from the right side. In the electronic flash apparatus according to the fourth exemplary embodiment, as shown in FIG. 5, the concave reflector 2 can include a flash-device reflecting surface 2a configured to reflect light beams La from a flash device 1a such as a xenon tube, a light-emitting-device reflecting surface 2b1 configured to reflect light beams Lb1 from a light emitting device 1b1 such as an LED, and another light-emitting-device reflecting surface 2b2 configured to reflect light beams Lb2 from another light emitting device 1b2 such as an LED. The flash device 1a can be disposed inside the concave reflector 2, and the light-emitting-device reflecting surfaces 2b1 and 2b2 can be disposed in the reflector 2 at respective positions where the light path of light beams La from the flash device 1*a* does not exist. Furthermore, the light emitting devices 1*b*1 and 1*b*2 can be disposed outside the concave reflector 2. The electronic flash apparatus can further include a light guide (light guiding lens) 3-1 to serve as a light guiding member configured to guide light beams Lb1 from the light emitting device 1*b*1 to the light-emitting-device reflecting surface 2*b*2 positioned inside the concave reflector 2, and another light guide (light guiding lens) 3-2 to serve as a light guiding member configured to guide light beams Lb2 from the light emitting device 1*b*2 to the light-emitting-device reflecting surface 2*b*1 positioned inside the concave reflector 2.

In the present exemplary embodiment, as shown in FIG. 5, the light beams Lb1 and Lb2 from the respective light emitting devices 1*b*1 and 1*b*2 cannot be incident on the flash-device reflecting surface 2*a*. Only the light beams La from the flash device 1*a* can be incident on the flash-device reflecting surface 2*a* to be reflected in the illumination direction of the electronic flash apparatus. Furthermore, the light beams La from the flash device 1*a* cannot be incident on the light-emitting-device reflecting surfaces 2*b*1 and 2*b*2. Instead, only the light beams Lb1 and Lb2 from the respective light emitting devices 1*b*1 and 1*b*2 can be incident on the light-emitting-device reflecting surfaces 2*b*1 and 2*b*2, to be projected in the illumination direction of the electronic flash apparatus. As a result, the electronic flash apparatus can control the light distribution properties of the light beams La, Lb1, and Lb2 from the flash device 1*a* and the light emitting devices 1*b*1 and 1*b*2 completely independently.

Specifically, in the electronic flash apparatus as shown in FIG. 5, the light emitting device 1*b*1, the light guide (light guiding lens) 3-1, and the light-emitting-device reflecting surface 2*b*1 can be disposed on the upper side of the flash-device reflecting surface 2*a*. Furthermore, the light emitting device 1*b*2, the light guide (light guiding lens) 3-2, and the light-emitting-device reflecting surface 2*b*2 can be disposed on the lower side of the flash-device reflecting surface 2*a*.

In the electronic flash apparatus of the fourth exemplary embodiment with the above configuration, the light beams Lb1 emitted from the light emitting device 1*b*1 disposed on the upper side of the flash-device reflecting surface 2*a* can be guided by the light guide (light guiding lens) 3-1 disposed on the upper side of the flash-device reflecting surface 2*a* to be directed toward the light-emitting-device reflecting surface 2*b*2 disposed on the lower side of the flash-device reflecting surface 2*a*. The light beams Lb1 can be reflected by the light-emitting-device reflecting surface 2*b*2 to be directed to the light-emitting-device reflecting surface 2*b*1 disposed on the upper side of the flash-device reflecting surface 2*a*. The light beams Lb1 can then be reflected by the light-emitting-device reflecting surface 2*b*1 to be projected in the illumination direction of the electronic flash apparatus (to the left side of FIG. 5).

Furthermore, the light beams Lb2 emitted from the light emitting device 1*b*2 disposed on the lower side of the flash-device reflecting surface 2*a* can be guided by the light guide (light guiding lens) 3-2 disposed on the lower side of the flash-device reflecting surface 2*a* to be directed toward the light-emitting-device reflecting surface 2*b*1 disposed on the upper side of the flash-device reflecting surface 2*a*. The light beams Lb2 can be reflected by the light-emitting-device reflecting surface 2*b*1 to be directed to the light-emitting-device reflecting surface 2*b*2 disposed on the lower side of the flash-device reflecting surface 2*a*. The light beams Lb2 can then be reflected by the light-emitting-device reflecting surface 2*b*2 to be projected in the illumination direction of the electronic flash apparatus (to the left side of FIG. 5).

Accordingly, the electronic flash apparatus of the fourth exemplary embodiment can control the light distribution properties of the light beams La, Lb1, and Lb2 from the flash device 1*a* and the light emitting devices 1*b*1 and 1*b*2 completely independently. In other words, the electronic flash apparatus of the fourth exemplary embodiment can control the three completely independent light distribution systems of respective light beams La, Lb1, and Lb2.

Figure 6:
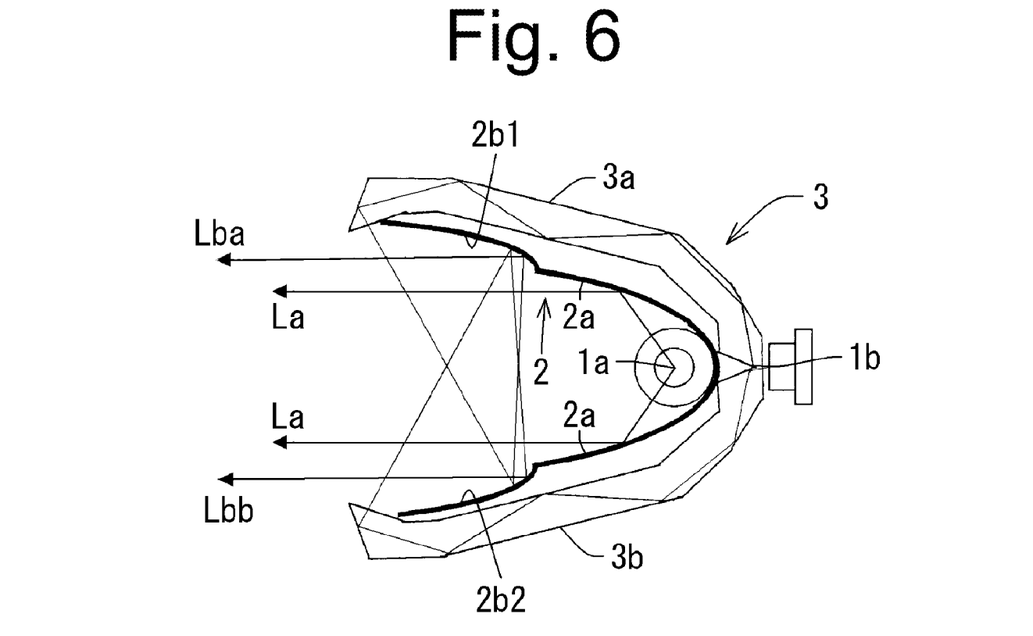
FIG. 6 is a cross-sectional view of an electronic flash apparatus according to still another exemplary embodiment.

A description will now be given of still another exemplary embodiment of the electronic flash apparatus of the present invention with reference to FIG. 6, which is a cross-sectional view illustrating the electronic flash apparatus according to a fifth exemplary embodiment of the present invention, when viewed from the right side. In the electronic flash apparatus according to the fifth exemplary embodiment, as shown in FIG. 6, the concave reflector 2 can include a flash-device reflecting surface 2*a* configured to reflect light beams La from a flash device 1*a* such as a xenon tube, and light-emitting-device reflecting surfaces 2*b*1 and 2*b*2 configured to reflect respective light beams Lba and Lbb from a light emitting device 1*b* such as an LED. In this apparatus, the flash device 2*a* can be disposed inside the concave reflector 2, and the light-emitting-device reflecting surfaces 2*b*1 and 2*b*2 can be disposed in the reflector 2 at respective positions where the light path of light beams La from the flash device 1*a* does not exist. Furthermore, the light emitting device 1*b* can be disposed outside the concave reflector 2. The electronic flash apparatus can further include a light guide (or a light guiding lens) 3 to serve as a light guiding member configured to guide light beams Lba and Lbb from the light emitting device 1*b* to the light-emitting-device reflecting surfaces 2*b*1 and 2*b*2 positioned inside the concave reflector 2.

In the present exemplary embodiment, the light beams Lba and Lbb from the light emitting device 1*b* cannot be incident on the flash-device reflecting surface 2*a*. Only the light beams La from the flash device 1*a* can be incident on the flash-device reflecting surface 2*a* to be reflected in the illumination direction of the electronic flash apparatus. Furthermore, the light beams La from the flash device 1*a* cannot be incident on the light-emitting-device reflecting surfaces 2*b*1 and 2*b*2. Only the light beams Lba and Lbb from the light emitting device 1*b* can be incident on the light-emitting-device reflecting surfaces 2*b*1 and 2*b*2 to be projected in the illumination direction of the electronic flash apparatus. As a result, the electronic flash apparatus can control the light distribution properties of the light beams La from the flash device 1*a* and the light beams Lba and Lbb from the light emitting device 1*b* completely independently.

Specifically, as shown in FIG. 6, the light emitting device 1*b* can be disposed behind the flash-device reflecting surface 2*a* (on the right side of FIG. 6). Furthermore, the light-emitting-device reflecting surfaces 2*b*1 and 2*b*2 can be formed so as to serve as an upper light-emitting-device reflecting portion 2*b*1 disposed on the upper side of the flash-device reflecting surface 2*a* and a lower light-emitting-device reflecting portion 2*b*2 disposed on the lower side of the flash-device reflecting surface 2*a*, respectively. In addition, the light guide (light guiding lens) 3 can include an upper light guiding portion 3*a* extending on the upper side of the flash-device reflecting surface 2*a* and a lower light guiding portion 3*b* extending on the lower side of the flash-device reflecting surface 2*a*.

In the electronic flash apparatus of the fifth exemplary embodiment with this configuration, part of the light beams Lba emitted from the light emitting device 1*b* disposed behind the flash-device reflecting surface 2*a* (on the right side of FIG. 6) can enter the light guide 3 and be guided by the upper light guiding portion 3a extending on the upper side of the flash-device reflecting surface 2a to be directed toward the lower light-emitting-device reflecting surface 2b2 disposed on the lower side of the flash-device reflecting portion 2a. The light beams Lba can be reflected by the lower light-emitting-device reflecting portion 2b2 to be directed to the upper light-emitting-device reflecting portion 2b1 disposed on the upper side of the flash-device reflecting surface 2a. Then, the light beams Lba can be reflected by the upper light-emitting-device reflecting portion 2b1 to be projected in the illumination direction of the electronic flash apparatus (to the left side of FIG. 6).

Furthermore, another part of the light beams Lbb emitted from the light emitting device 1b disposed behind the flash-device reflecting surface 2a (on the right side of FIG. 6) can enter the light guide 3 and be guided by the lower light guiding portion 3b extending on the lower side of the flash-device reflecting surface 2a to be directed toward the upper light-emitting-device reflecting portion 2b1 disposed on the upper side of the flash-device reflecting portion 2a. The light beams Lbb can be reflected by the upper light-emitting-device reflecting portion 2b1 to be directed to the lower light-emitting-device reflecting portion 2b2 disposed on the lower side of the flash-device reflecting surface 2a. Then, the light beams Lbb can be reflected by the lower light-emitting-device reflecting portion 2b2 to be projected in the illumination direction of the electronic flash apparatus (to the left side of FIG. 6).

In the electronic flash apparatus of the fifth exemplary embodiment with this configuration, the light beams from the single light emitting device 1b can be efficiently utilized. That is, the electronic flash apparatus with this configuration does not need an increased number of light emitting devices, and can still increase the area from which light beams can be projected in the illumination direction of the apparatus (to the left side of FIG. 6).

Hereinafter, a description will be given of still another exemplary embodiment of the electronic flash apparatus of the present invention. The electronic flash apparatus of the present exemplary embodiment has almost the same structure as in the fifth exemplary embodiment except for the features described later. Accordingly, the electronic flash apparatus of the present exemplary embodiment can provide almost the same advantageous effects as in the fifth exemplary embodiment in addition to the additional advantageous effects described later.

Figure 7:
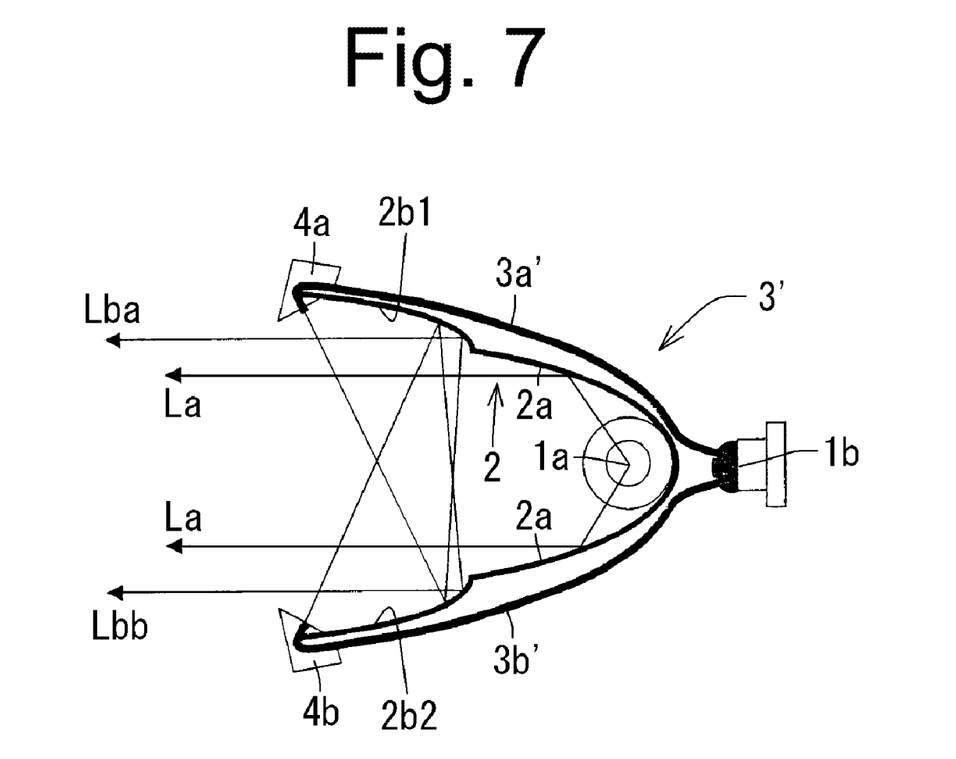
FIG. 7 is a cross-sectional view of an electronic flash apparatus according to another exemplary embodiment.

FIG. 7 is a cross-sectional view illustrating the electronic flash apparatus according to a sixth exemplary embodiment of the present invention, when viewed from the right side. In the electronic flash apparatus of the fifth exemplary embodiment, as shown in FIG. 6, the light guide (light guiding lens) 3 is used as a light guiding member configured to guide the light beams from the light emitting device 1b to the light-emitting-device reflecting surfaces 2b1 and 2b2 provided inside the concave reflector 2. In the electronic flash apparatus of the sixth exemplary embodiment, as shown in FIG. 7, an optical fiber 3' can be used as the light guiding member.

Specifically, as shown in FIG. 7, the light emitting device 1b can be disposed behind the flash-device reflecting surface 2a (on the right side of FIG. 7). Furthermore, the light-emitting-device reflecting surfaces 2b1 and 2b2 can be formed so as to serve as an upper light-emitting-device reflecting portion 2b1 disposed on the upper side of the flash-device reflecting surface 2a and a lower light-emitting-device reflecting portion 2b2 disposed on the lower side of the flash-device reflecting surface 2a, respectively. In addition to this, the optical fiber 3' can include an upper optical fiber portion 3a' extending on the upper side of the flash-device reflecting surface 2a and a lower optical fiber portion 3b' extending on the lower side of the flash-device reflecting surface 2a.

In the electronic flash apparatus of the sixth exemplary embodiment with this configuration, part of the light beams Lba emitted from the light emitting device 1b disposed behind the flash-device reflecting surface 2a (on the right side of FIG. 7) can enter the optical fiber 3' and be guided by the upper optical fiber portion 3a' extending on the upper side of the flash-device reflecting surface 2a to be directed toward the lower light-emitting-device reflecting surface 2b2 disposed on the lower side of the flash-device reflecting portion 2a. The light beams Lba can be reflected by the lower light-emitting-device reflecting portion 2b2 to be directed to the upper light-emitting-device reflecting portion 2b1 disposed on the upper side of the flash-device reflecting surface 2a. Then, the light beams Lba can be reflected by the upper light-emitting-device reflecting portion 2b1 to be projected in the illumination direction of the electronic flash apparatus (to the left side of FIG. 7). The front side (left side of FIG. 7) end portion of the upper optical fiber portion 3a' can be fixed by a fixing member 4a to the reflector 2 so that the light beams Lba projected from the end portion thereof can be surely directed to the lower light-emitting-device reflecting portion 2b2.

Furthermore, another part of the light beams Lbb emitted from the light emitting device 1b disposed behind the flash-device reflecting surface 2a (on the right side of FIG. 7) can enter the optical fiber 3' and be guided by the lower optical fiber portion 3b' extending on the lower side of the flash-device reflecting surface 2a to be directed toward the upper light-emitting-device reflecting portion 2b1 disposed on the upper side of the flash-device reflecting portion 2a. The light beams Lbb can be reflected by the upper light-emitting-device reflecting portion 2b1 to be directed to the lower light-emitting-device reflecting portion 2b2 disposed on the lower side of the flash-device reflecting surface 2a. Then, the light beams Lbb can be reflected by the lower light-emitting-device reflecting portion 2b2 to be projected in the illumination direction of the electronic flash apparatus (to the left side of FIG. 7). The front side (left side of FIG. 7) end portion of the lower optical fiber portion 3b' can be fixed by another fixing member 4b to the reflector 2 so that the light beams Lbb projected from the end portion thereof can be surely directed to the upper light-emitting-device reflecting portion 2b1.

As in the fifth exemplary embodiment, the electronic flash apparatus of the sixth exemplary embodiment with this configuration can increase the area from which light beams can be projected in the illumination direction of the apparatus (to the left side of FIG. 7) using a single light emitting device 1b.

In the present exemplary embodiment, as shown in FIG. 7, the flexible optical fiber 3' is employed as the light guiding member. When compared with the case where a rigid light guide such as a light guiding lens is employed as a light guiding member, the degree of freedom for the layout of the light emitting device 1b can be improved according to the present exemplary embodiment. Accordingly, as a modified example, the light emitting device 1b can be disposed on any of the front side (on the left side of FIG. 7), upper side, and lower side of the flash-device reflecting surface 2a in accordance with intended applications.

Any two or more of the above-described exemplary embodiments can be combined with each other in accordance with intended applications.

The electronic flash apparatus of the present invention can be applicable to various apparatuses such as an apparatus utilizing an imaging device, a digital video camera, a cell phone, an optical beacon apparatus, and the like.

It will be apparent to those skilled in the art that various modifications and variations can be made in the present invention without departing from the spirit or scope of the present invention. Thus, it is intended that the present invention cover the modifications and variations of the present invention provided they come within the scope of the appended claims and their equivalents. All related art references described above are hereby incorporated in their entirety by reference.

What is claimed is:

1. An electronic flash apparatus comprising:
a flash device;
a light emitting device which is different from the flash device;
a concave reflector configured to reflect light beams from the flash device and the light emitting device, the concave reflector including a flash-device reflecting surface configured to reflect the light beams from the flash device and a light-emitting-device reflecting surface configured to reflect the light beams from the light emitting device, the flash device being disposed inside the concave reflector, the light-emitting-device reflecting surface being disposed at a position where a light path of the light beams from the flash device does not exist, and the light emitting device being disposed outside the concave reflector; and
a light guiding member having a light entering portion and a light exiting portion, the light exiting portion including a foremost end reflecting surface;
wherein the concave reflector has a first side and a second side that face each other, and the light emitting device and the light guiding member are disposed outside the first side of the reflector;
wherein the light guiding member extends more forward than a front edge of the concave reflector, so that the foremost end reflecting surface is positioned beyond a front end of the first side of the concave reflector; and
wherein the light guiding member is configured to guide the light beams from the light emitting device by allowing the light beams to enter the light entering portion and reflecting the light beams by the foremost end reflecting surface to direct the light beams to exit from the light exiting portion and be reflected by the light-emitting-device reflecting surface positioned inside the concave reflector.

2. The electronic flash apparatus according to claim 1, wherein the light-emitting-device reflecting surface is disposed on the second side of the reflector.

3. The electronic flash apparatus according to claim 1, wherein:
the reflector has an intermediate reflecting surface configured to reflect the light beams from the light guiding member to the light-emitting-device reflecting surface;
the light emitting device, the light guiding member, and the light-emitting-device reflecting surface are disposed on the first side of the reflector; and
the intermediate reflecting surface is disposed on the second side of the reflector.

4. The electronic flash apparatus according to claim 3, wherein the light-emitting-device reflecting surface comprises a plurality of flat stepped surfaces and the intermediate reflecting surface comprises a plurality of flat stepped surfaces.

5. The electronic flash apparatus according to claim 1, wherein:
the apparatus comprises a plurality of the light emitting devices, a plurality of the light-emitting-device reflecting surfaces, and a plurality of the light guiding members;
respective quantities of the light emitting devices, the light-emitting-device reflecting surfaces, and the light guiding members are the same; and
one of the light emitting devices, a corresponding one of the light guiding members, and a corresponding one of the light-emitting-device reflecting surfaces form one optical system including a light path.

6. The electronic flash apparatus according to claim 1, wherein the light guiding member is flexible.

7. The electronic flash apparatus according to claim 2, wherein the light guiding member is flexible.

8. The electronic flash apparatus according to claim 3, wherein the light guiding member is flexible.

9. The electronic flash apparatus according to claim 4, wherein the light guiding member is flexible.

10. The electronic flash apparatus according to claim 5, wherein the light guiding member is flexible.

* * * * *